Patented Oct. 13, 1931

1,826,701

UNITED STATES PATENT OFFICE

SHIRLEY L. AMES, OF PASADENA, CALIFORNIA, AND LEONARD DAY, OF NEW YORK, N. Y., ASSIGNORS TO CHEM-ELECTRIC ENGINEERING CORPORATION, A CORPORATION OF NEW YORK

SPRAY-DRIED SUGAR

No Drawing. Application filed April 9, 1924, Serial No. 705,337. Renewed February 18, 1931.

This invention relates to a new sugar and the process of manufacturing the same.

Subsequently to the date on which SHIRLEY L. AMES completed his invention as set forth in co-pending application, Ser. No. 684,200, filed January 3, 1924, for Production of dry sugar, we have conducted research, extended experimentation and investigation of this subject and have discovered a greatly improved method of producing a similar product. In fact, this product, in its commercial aspect, is a sugar which is new both over what is now commercially known and over the sugar set forth in the aforementioned application.

Heretofore, it has been common practice in producing commercial sugars, first, to reduce the sugar containing juice largely by heat to a sufficient density to permit and cause the crystallizing out of sucrose. In this process, the syrup resulting from the concentration of the juice takes on a dark color, largely due to caramelization, and the sugar crystallizing out from such syrup as sucrose is contaminated with a surface coating of the dark colored liquid from which it has heretofore been necessary to free it before a finished article of commerce was completed.

It is our object to produce a white table sugar either of sucrose or of a composition of part sucrose, part inverts and part other solids, for example, preferably a white table sugar comprising all of the solids of the plant juice source such as sugar cane juice, except those which may be considered deleterious to the human system such, for example, as the natural acids, waxes, gums, fats and resins. An important desideratum of such a sugar is that it be non-hygroscopic, that is, substantially of the same character so far as tendency to absorb moisture is concerned or so far as its tendency to melt is concerned, as is ordinary granulated sugar (sucrose of commerce).

With these general objects in view, we propose, as the preferred process to be practiced, first the defecation of the plant juice source and then the rapid elimination of the major portion of all of the water contained in the juice without effecting incidental caramelization, this step to include spray drying, and, thereafter, the fixing of the resultant product into non-hygroscopic form by the application of heat substantially uniformly to the resulting substance to effect an internal structural change in the minuted spheres resulting from the spray drying. In accordance with one modification of the process, the product from the spray dryer may be collected in any well known manner, such as through the medium of a cyclone separator or through the medium of an electrified separator. The mass so collected is in the form of myriads of minute spheres and, as a mass, is hygroscopic. This mass may then be spread out continuously on a travelling metal apron suitably heated for a portion of its travel, preferably to about 230° Fahrenheit. The continuance of the subjection of this sugary mass to approximately this temperature, or in fact to heat ranging in temperature from about 200° Fahrenheit to about 300° Fahrenheit, should be continued until a noticeable contraction in the mass has taken place and the layer on the apron has assumed an appearance in structure somewhat like pumice stone. At this stage, the travelling apron is cooled, causing a consequent cooling of the carried super-imposed layer of the sugary mass under treatment. The cooling need not be very great, but is preferably to be continued down to a temperature of about 100° Fahrenheit. At the end of its forward travel, the metal apron should pass over some direction changing device such as a roller whereby the bend in the apron causes the cooled friable super-imposed layer of sugary substance to crack off automatically, where and when it may be discharged immediately into hoppers leading into grinding machines grinding the mass to the desired size if desired; or, of course, the flaked off particles may be bagged immediately without further treatment.

As another modification of the method for transforming the ordinary product of the spray dryer which, as heretofore mentioned, is hygroscopic in the form of myriads of minute spheres into the non-hygroscopic condition, it may be preferable to cause these spheres after the partial completion of the dehydrating process in the spray dryer to be maintained freely in an atmosphere of gases at a sufficiently high temperature, say, 230° Fahrenheit for a sufficient length of time to effect individually, within each sphere, the internal structural change heretofore mentioned. Within each sphere itself, this structural change is marked, whether this latter modification of the process be practiced or whether the previous modification, using the application of heat to a layer or mass of the product be employed, namely, the little spheres of the ordinary spray dried product under a microscope of 400 or 500 diameters magnification appear to be transparent, their surfaces reflect light, they have an appearance of being made up of a viscous mass, they have the appearance of possessing great surface tension holding them in the spherical form. they appear to adhere to the glass slide of the microscope employed and they appear to have cohesion one to the other, to a greater or lower degree. On the other hand, after processing by either of the methods heretofore described, these little spheres, when observed under the same microscopic conditions, no longer reflect light from their surface as if they were fluid. They give the appearance of solidity, they are opaque, many of the spheres are fractured and the fractured portions show the same structure through the fracture as upon the spherical surface remaining. They have changed from an approximate water colorlessness to an approximate milky whiteness, no longer do they show any tendency to adhere to one another, no longer do they show a tendency to adhere to the slide of the microscope; but, above all, in mass they are no longer hygroscopic for all practical purposes, that is, this new processed substance may be bagged or packed in barrels, the same as can be the ordinary granulated sugar of commerce without caking. More in amplification,—size for size of particles, there appears to be an apparent equality as to hygroscopicity between this product and the sucrose of commerce. This quality of non-hygroscopicity we have found to be existent, although the product itself is not necessity anhydrous. We use the word "anhydrous" in its full meaning. We mean either that this new product may contain some water either in intimate association throughout the mass and not as water of crystalization or that the water may be contained as water of crystalization and some in addition in an intimate association and distribution.

As a plausible theory for the physical changes noted in the product due to this process, we offer for consideration the following theory:

During the process of spray drying although the droplets of juice may exist for some time in a gaseous atmosphere, the gas being at a high temperature, the evaporation of water from the droplet maintains the droplet locus at a relatively low temperature. At the completion of the ordinary spray drying process the droplets reduced to microscopic spheres are probably a homogeneous viscous fluid made up of water and some substance called "X" in solution. The microscopic droplet is under a tremendous compressing force due to surface tension about the spherical surface of the droplet. When increased molecular activity and possible intermolecular activity is imparted to the substance of these droplets by subjecting them to heat, a large portion of the water contained in each droplet in the form of water radicals enters into chemical combination with the substance to form myriads of sub-microscopic or microscopic crystals. If the original substance from which the droplets were spray dried was a solution of sucrose in water, the resulting minute crystals are sucrose. When the source of the syrup is such that there are other substances present than sucrose, the small percentage of these other substances are probably imprisoned in the stratifications to these crystals.

The product resulting from the Ames process described in the aforementioned application apparently has all of the distinguishing characteristics over the ordinary spray dried product as have previously above been enumerated for the product of this joint invention, except perhaps complete hygroscopicity.

In the practice of the process, the rapid elimination of the water content of the juice must, according to our present belief, at least in large part, be effected by spray-drying. This we believe particularly to be true in the event that the sugar carrying juice or syrup be of a density or condition approaching or approximating that at which sucrose tends to crystalize out. According to our preferred process, the elimination of the water content of the sugar source may, most economically, be effected in at least two stages; the first stage, the removal of water within the percentage limits under which crystalization of the sucrose content does not take place. This may be effected economically by any of the usual evaporators, preferably a multiple effect evaporator with condenser operating at temperatures below the boiling point of water, so as not to effect caramelization and the consequent darkening of the juice. It is preferred that this stage of water removal be not continued beyond a density of approximately 60° Brix for the syrup. After this initial water removal step, the still water white syrup should be spray-dried in any approved type of spray-drying apparatus preferably one of those designed by the joint applicant, Ames.

The resultant product, after spray-drying, and if this product is collected in any of the common ways for collecting spray-dried products, will be discovered to be initially a substantially dried powder. Under the microscope, this powder is made up of myriads of minute spheres, which are transparent, approximately colorless like water, and the surfaces of which are light reflecting, but the product in mass is white. At this stage, however, the product has a defect. It is hygroscopic. If left some length of time in a moist atmosphere, it takes up moisture and ultimately becomes gooey, and after the passage of considerable time, the minute spheres disappear so that the whole is nothing more than a syrup. As another characteristic, when a sample is taken into the mouth it seems to agglomerate and become a chewey mass which is unlike the action of ordinary granulated sucrose, which latter dissolves without agglomerating and without becoming chewey and with the grains more or less distinct until the whole is dissolved. Even upon exposure to moist air for a number of days, the mass will cake together in lumps or into one solid lump.

The joint inventor, Ames, discovered, as set forth in the aforementioned co-pending application that by subjecting such spray-dried sugar to trituration with ether and subsequently removing the ether that the resultant substance became non-hygroscopic. Further investigation by us had disclosed the fact that this ether treatment also causes the appearance of the microscopically visible spheres to change. They lose their transparency and become individually milky white and opaque, some of them acquire excrescencies, some of them are broken. When just spray-dried, the spheres give the appearance under the microscope of being composed of a viscous mass under severe surface tension sufficient to maintain the spherical form. After the ether treatment, the spherical form in large measure is retained, but there is no apparent viscosity. On the contrary, the little spheres appear to be solid and possibly minutely granular. Under this ether process, there is difficulty in removing the last traces of the ether so as to supply the resultant product completely ether-free so far as flavor and odor is concerned. At this stage, as a substitute for the ether process, comes in an important feature of the present joint invention. If the spray-dried product heretofore mentioned is subjected preferably uniformly throughout the mass under treatment to gentle heat at a temperature preferably not much above 212° Fahrenheit, the spray-dried powdered mass made-up of minute spheres changes into an apparently vitreous mass. An efficient way of accomplishing this purpose is to spread out the spray-dried product in a thin layer on a suitable surface to the under side of which surface is applied heat at the desired temperature and for a sufficient length of time to effect the transformation. The mass is then allowed to cool. It has become a friable substance, hard, brittle, white, somewhat like pumice stone, except as to color. This friable solid mass may then be ground to the desired granular size. It is found to be non-hygroscopic and again cannot be melted without the addition of water much below the melting point of sucrose. The melting requires a temperature nearer to 372° Fahrenheit. The product resulting from this heating, cooling and grinding process when examined under the microscope is likewise found to be made up of minute spheres and fractions of spheres, the proportion of whole spheres to fractions of spheres being less in proportion to the severity of the grinding. These minute spheres and fractions of spheres are found to have lost their transparency. They are apparently solid. They are milky white and they are opaque, in fact, they resemble, with a considerable approach to identity, the structure resulting from the aforementioned ether process, but, of course, they have no ether smell or taste, as no ether is used in their production.

We have found that the non-hygroscopic product resulting from our process has all the characteristics described as to spherical form, opacity, milky-whiteness, non-hygroscopicity, regardless of whether the finished substance is substantially all sucrose or so-called sucrose with a percentage of other solid substances common in a sugar source from which the product is made up even to as high a percentage as 13% for the solids other than sucrose.

For example, it has been found that the process is applicable to the production of a substantially non-hygroscopic sugary substance containing sucrose and at least 5% of other sugar and salts natural to sugar cane juice and even upward for such percentage to as high as 13% for the solids other than sucrose.

In other words, we are persuaded to the belief that the substance in water solution which may be crystalized out as so-called sucrose is perhaps not sucrose in the solution but is rather an unknown which, combining with one or more water radicals, forms sucrose. When forming our product of a mixture in its final form of sucrose with inverts and other solids, we are not prepared to state whether the sucrose contained is in fact in the form of sub-microsopic crystals, whether the inverts and other solids are in fact in the form of sub-microscopic crystals, whether the sucrose content is in the form of sub-microscopic crystals collected together in the outer form of minute spheres and imprisoning within their own minute stratifications the inverts and other solids as impurities or whether this new substance is merely a new association of sucrose and other solids in some unknown ultimate form or composition; but we do, in fact, know that the finished product is substantially non-hygroscopic; and that it comes into existence in the form of spheres and fractions of spheres, appearing milky white, opaque, solid and apparently made up of collections of some still smaller subdivisions than the spheres and fractions of spheres themselves.

By way of emphasis, to sum up our conclusions, it has been found that pure sucrose dissolved in water and the resultant solution spray-dried results in a substance, unlike the crystals of sugars of commerce, is hygroscopic. The minute spheres are transparent, apparently of a viscous substance under severe surface tension, but that this spray-dried sucrose product, if subjected to our heating and cooling treatment, results in a product which can be nothing more than sucrose and which we have found to be non-hygroscopic, made up of minute spheres and fractions of spheres, which are milky-white, opaque, non-viscous and apparently made up of a sub-structure of still smaller particles than the microscopic spheres and fractions of spheres visible under a microscope of 500 diameters magnification.

In connection with the theory that the substance in water solution subsequently crystalizable out as sucrose is itself not sucrose, attention is called to the fact that so-called sucrose in the form of pure crystals has a specific gravity of 1.591, while the hypothetical solid sucrose in aqueous solution has a specific gravity of 1.556. It is logical to expect that the same substances always should have the same specific gravity.

As an illustration of the application of our process, with more particular regard to sucrose, it is contemplated that the product may result from the initial employment of a clarified syrup made from dissolving raw sugar of commerce in water instead of starting initially with the plant juice such as sugar cane juice. In this instance, the resultant product would be largely sucrose in a new form although, of course, even when starting from the raw sugar of commerce as a source for the finished sugar, other ingredients may be added to the inital syrup such, for example, as the black strap molasses, which contain a certain amount of sucrose with invert sugar and salts and water, and whatever other material the molasses may contain. However, should this molasses be added it would be preferable to clarify and decolorize the syrup by any suitable known process such as by filteration through bone char.

The inventive thought may have a variety of expressions as is contemplated by what we claim and desire to secure by United States Letters Patent as follows:

1. As an article of manufacture, an odorless sugary substance, in the form of microscopic spheres and fragments of spheres, which are milky-white and opaque under the microscope, and which comprise a microscopic substructure of things different from and smaller than said microscopic spheres and fragments of spheres.

2. As an article of manufacture, an odorless sugary substance, in the form of microscopic spheres and fragments of spheres, and having a substructure of microscopically small crystals and which substance is substantially non-hygroscopic.

3. As an article of manufacture, an odorless sugary substance, in the form of microscopic spheres and fragments of spheres, which are milky-white and opaque under the microscope which comprise a substructure of microscopically small crystals and which substance is substantially non-hygroscopic.

4. The process of producing a sugary substance, comprising spraying a stream of sugar containing water solution into a current of drying air suddenly to remove a large percentage of the water content of said solution; subjecting the resulting powder to heat until a vitreous mass is formed; and cooling said vitreous mass.

5. The process of producing a sugary substance, comprising spraying a stream of sugar containing water solution into a current of drying air suddenly to remove a large percentage of the water content of said solution; subjecting the resulting powder to heat until a vitreous mass is formed; and cooling said vitreous mass; then grinding the so-solidified mass into grains of the desired size.

6. The process of transforming a hygroscopic sugary substance in the form of microscopic spheres into a substantially non-hygroscopic substance comprising the application of heat to said substance in the form of microscopic spheres until said spheres become opaque.

7. The process of forming a substantially non-hygroscopic sugary substance containing sucrose and at least five percent of other sugar and salts natural to sugar cane juice comprising spray drying a water solution of said substances to the condition of a powder; then heating said powder until apparent vitrification of the substance of the particles takes place.

In witness whereof, we have signed our names to this specification, this 8th day of April, 1924.

LEONARD DAY.
SHIRLEY L. AMES.